United States Patent [19]

Uchiyama et al.

[11] Patent Number: 5,780,794
[45] Date of Patent: Jul. 14, 1998

[54] COMPOSITE SWITCH LEVER FOR AUTOMOBILES WITH MECHANICALLY-COUPLED SWITCH KNOBS

[75] Inventors: Norio Uchiyama; Toshiaki Yokoyama, both of Tokyo, Japan

[73] Assignee: Niles Parts Co., Ltd., Japan

[21] Appl. No.: 785,000

[22] Filed: Jan. 17, 1997

[30] Foreign Application Priority Data

Jan. 18, 1996 [JP] Japan .................... 8-024680

[51] Int. Cl.⁶ .................... H01H 9/00; H01H 9/26
[52] U.S. Cl. .................... 200/61.54; 200/5 R
[58] Field of Search .................... 200/61.27, 61.54, 200/4, 5 R

[56] References Cited

U.S. PATENT DOCUMENTS

| | | | |
|---|---|---|---|
| 5,107,243 | 4/1992 | Maeda | 338/172 |
| 5,272,290 | 12/1993 | Suzuki et al. | 200/4 |
| 5,581,058 | 12/1996 | Javery et al. | 200/4 |
| 5,629,505 | 5/1997 | Cryer | 200/61.54 |
| 5,665,948 | 9/1997 | Oikawa | 200/61.54 |
| 5,670,765 | 9/1997 | Yokoyama et al. | 200/61.54 |

FOREIGN PATENT DOCUMENTS 56-98636   8/1981   Japan.

Primary Examiner—Michael L. Gellner
Assistant Examiner—Michael J. Hayes
Attorney, Agent, or Firm—Rader, Fishman & Grauer

[57] ABSTRACT

A composite switch lever 2 for mounting on the steering column of an automobile is provided with a rotary light switch knob 25 for switching a light switch 24 and a rotary fog switch knob 28 for driving a fog light intermittence switch 29. The switch knobs 25, 28 are rotatably mounted on a lever shaft 13 and an outer cylindrical shaft 14. The switch knobs 25, 28 are coupled with each other through a related operation mechanism (A) composed of a connecting projection 32 and an interfering hole 33 for mechanically coupling the switch knobs 25, 28 with a predetermined idle angle. The composite switch lever 2 prevents a situation where a driver forgets to switch off lights upon getting out of the automobile or turning on a small light. The composite switch lever 2 also makes it possible to reduce the volume of wiring harness between plural switches and lights.

12 Claims, 7 Drawing Sheets

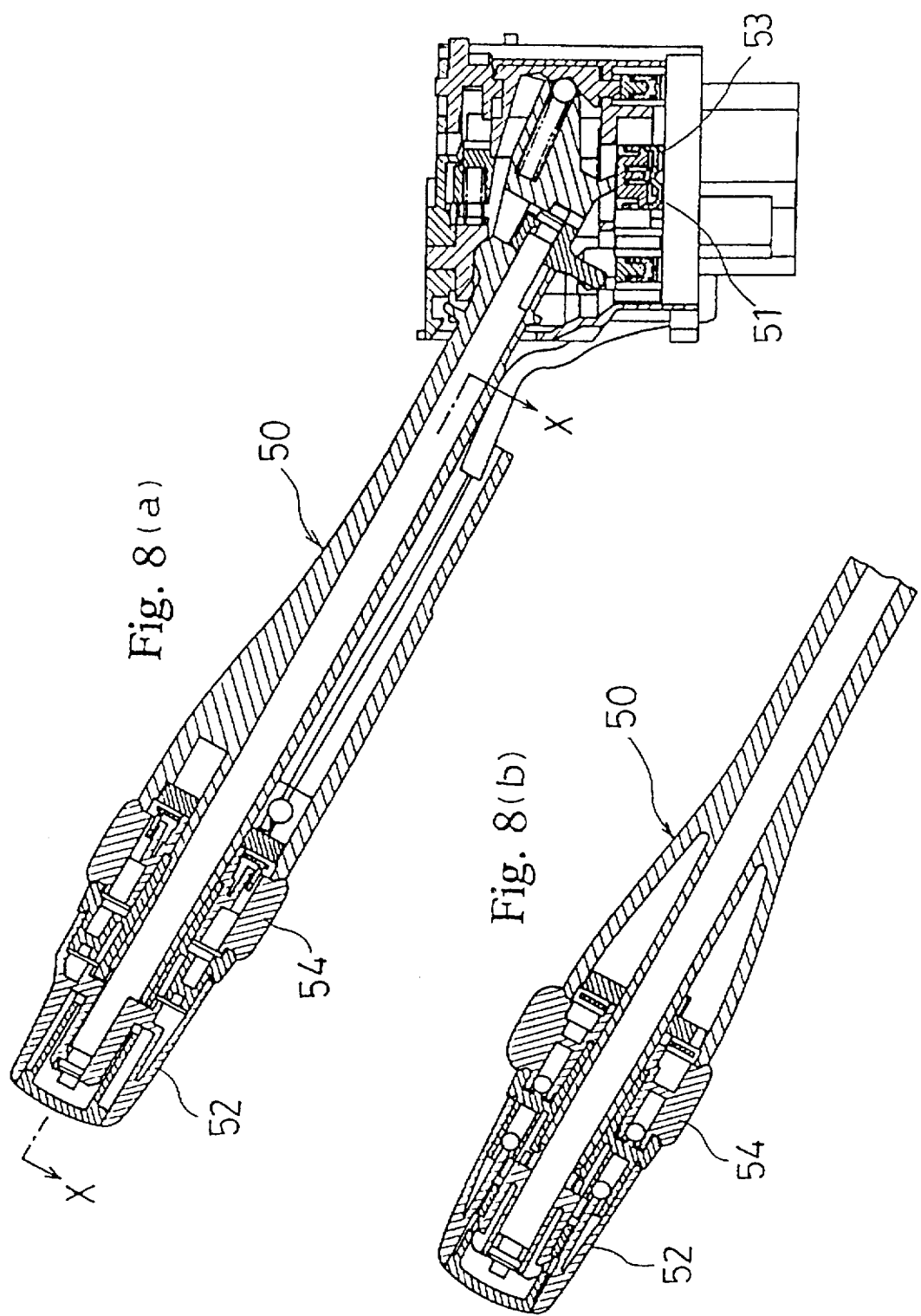

COMPOSITE SWITCH LEVER FOR AUTOMOBILES WITH MECHANICALLY-COUPLED SWITCH KNOBS

BACKGROUND OF THE INVENTION

1. Field of the Invention

The present invention relates generally to switches integrally installed with a composite switch lever mounted on a steering column for automobiles and, more particularly, to an improvement in a composite switch lever apparatus for automobiles provided with a light switch and a fog light intermittence switch for switching a head light and a small light.

2. Description of the Prior Art

A conventional composite switch lever mounted on a steering column of an automobile is disclosed, for example, in Japanese Utility Model Publication No. 59-25708. A plurality of rotary switches can be mounted on the composite switch lever and manually actuated by the composite switch lever.

A conventional composite switch lever of this type is the composite switch lever 50, as shown in FIGS. 8(a) and 8(b), composed of a turn signal switch 51, a light switch 52, a dimmer and passing switch 53, and a fog light intermittence switch 54.

In the composite switch lever 50, the light switch 52 and the fog light intermittence switch 54 have independent rotary switch knobs, respectively. Although both rotary switches are mounted on a single composite switch lever 50, they are independently operated for switching plural lights, for turning off light, and for turning off a fog light.

Therefore, when the light switch 52 has been switched OFF, the fog light intermittence switch 54 may still remain ON undesirably. Moreover, when the fog light is switched ON, it is necessary to switch ON the front/rear small lights and/or the rear light. Therefore, two circuit systems for the rear light are inevitably necessary for the light switch 52 and the fog light intermittence switch 54, thereby making the wiring harness complex and resulting in higher manufacturing cost.

SUMMARY OF THE INVENTION

The present invention is made for solving the above mentioned problems. The object of the present invention is to provide a composite switch lever for automobiles in which a light switch and a fog light intermittence switch installed in the composite switch lever are communicated with each other during operation, and to reduce the number of circuits connecting switches.

More specifically, the object of the present invention is to present a composite switch lever apparatus for automobiles, wherein when both of the light switch and the fog intermittence switch are switched ON, if the light switch is manually switched OFF, the fog light intermittence switch is also switched OFF, and moreover when both switches are switched OFF, if the fog light intermittence switch is manually switched ON, the light switch is also operated to make a small light in connection with the ON state of the fog light intermittence switch.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a composite switch lever apparatus for automobiles is provided in which the composite switch lever apparatus has a composite switch lever the base portion of which is swingably mounted on a base block mounted on a steering column of an automobile, and a plurality of rotary switches are coupled to the composite switch lever. A first rotary switch knob for actuating one switch group ON and OFF intermittently and a second rotary switch knob for actuating the other switch group ON and OFF intermittently are rotatably mounted on the composite switch lever with a common axis, and the first rotary switch knob and the second rotary switch knob are mechanically coupled with each other through a related operation mechanism with a predetermined idle angle in a rotation direction.

Moreover, the first rotary switch knob and the second rotary switch knob are preferably composed of a light switch for selectively switching a plurality of switch terminals and a fog light intermittence switch for intermittently connecting switch terminals, and said related operation mechanism couples the switches to relate together selected positions of the light switch and the fog light intermittence switch.

Moreover, the related operation mechanism is preferably composed of a light switch knob with a connecting projection, a fixed knob provided with a through hole having a rectangular shape extending in the peripheral direction, and a fog switch knob provided with an interfering hole with a rectangular shape, and the connecting projection has end points inserted into the interfering hole through the through hole.

Moreover, the fixed knob of the present invention is preferably operated by providing a click contact structure movably inserted into the gap formed between the contact projections of the fog switch knob at both walls of the through hole in the peripheral direction and an elevation wall adapted to be contacted to the side walls of the contact projections.

Moreover, the light switch knob is preferably supported at the end portion of a lever shaft rotatably supported on an outer cylinder shaft of the composite switch lever, the fixed knob is fitted to the end point of the outer cylinder shaft through the fog switch knob, and the fog switch knob is rotatably supported by the outer cylinder shaft in a single shaft structure.

Moreover, the composite switch lever preferably further comprises a fog light intermittence switch composed of a short member contacted to the fog switch knob, and a fixed pole plate for a fog light fixed on the composite switch lever.

Moreover, when the fog switch knob is rotated, the fog light intermittence switch preferably actuates either one of a front fog light and a rear fog light by a first stage operation, and actuates both of the front fog light and the rear fog light by a second stage operation.

The first rotary switch knob (the light switch) and the second rotary switch knob (the fog light intermittence switch) are mechanically coupled through a related operation mechanism contacting with a predetermined idle angle in the peripheral direction. Therefore, upon the switching operation of the fog switch knob, if the fog light intermittence switch is set to the ON position, the related operation mechanism rotates the light switch knob thereby positioning the light switch to its ON position in order to actuate the small light of the automobile.

When the fog light is actuated, if the light switch is set to its OFF position by operating the light switch knob, the related operation mechanism rotates the fog switch knob thereby positioning the fog light intermittence switch to its OFF position, thereby making the fog light OFF. Therefore, an operator of the automobile is prevented from forgetting to extinguish the fog light during the OFF state of the light switch, and from forgetting to energize the small light during the ON state of the fog light.

BRIEF DESCRIPTION OF THE DRAWINGS

The present invention will become more clearly appreciated as the disclosure of the invention is made with reference to the accompanying drawings. In the drawings:

FIGS. 4(a) to 4(d) illustrate a related operation mechanism, wherein FIG. 4(a) is an enlarged sectional view of the mechanism; FIG. 4(b) is a view taken along the line B—B; FIG. 4(c) is a view taken along the line C—C; and FIG. 4(d) is a view taken along the line D—D.

FIG. 8(a) is a sectional view showing a conventional composite switch lever apparatus, and FIG. 8(b) is a view taken along the line X—X in FIG. 8(a).

DETAILED DESCRIPTION OF THE INVENTION

Figure 1:
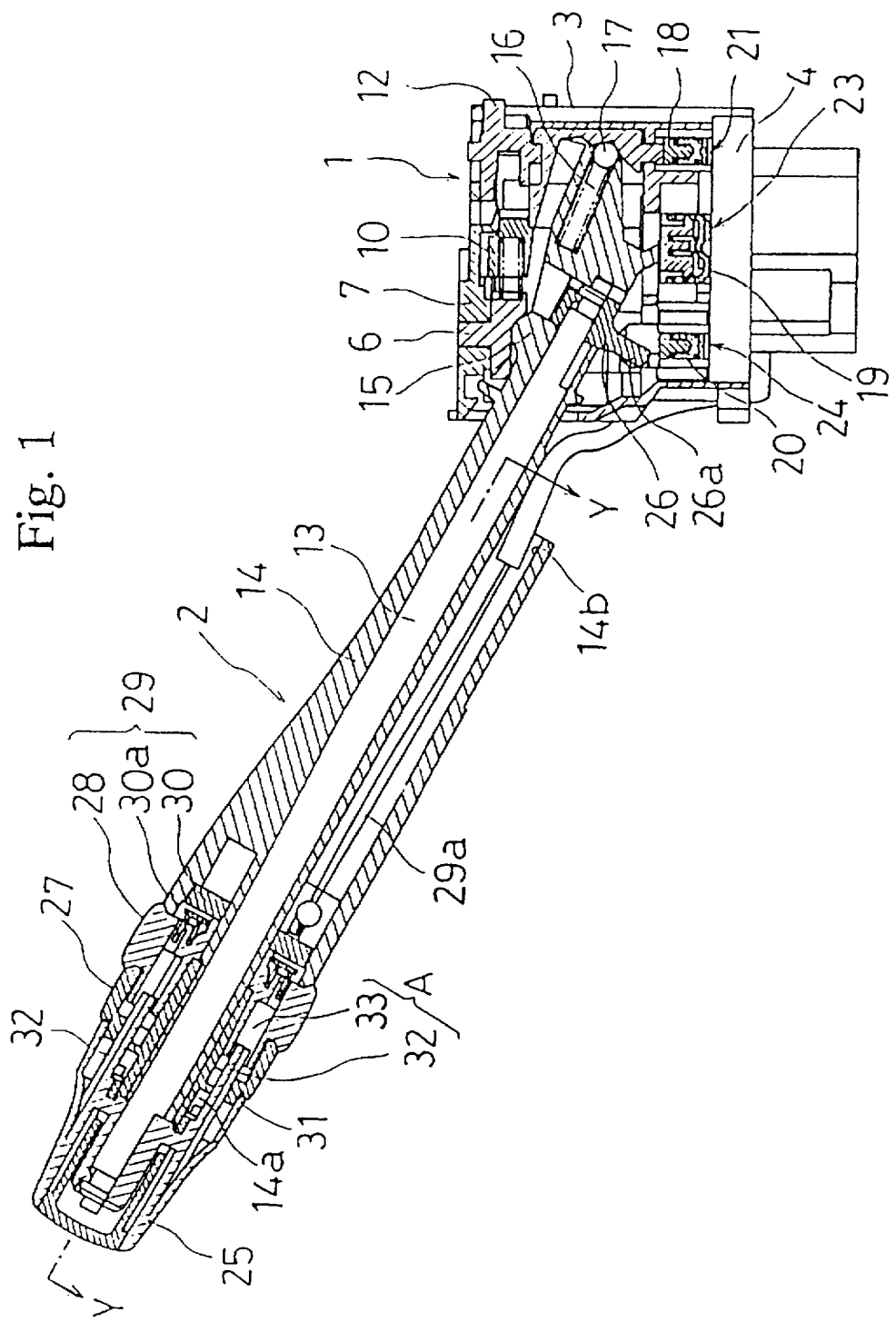
FIG. 1 is a sectional view of a composite switch lever apparatus for automobiles according to a preferred embodiment of the present invention.
Figure 2:
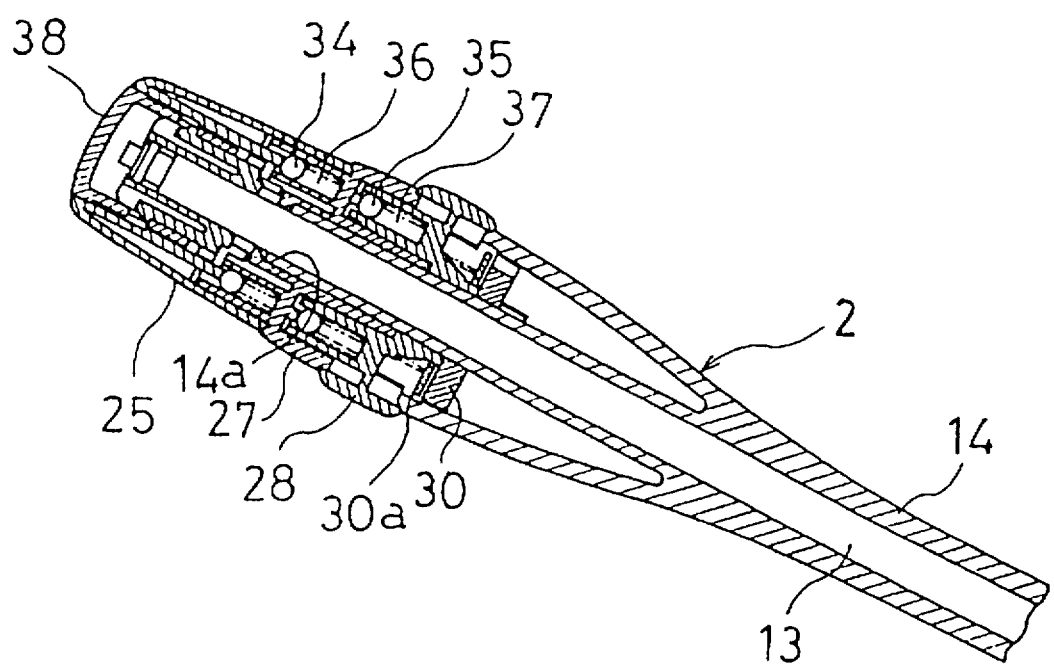
FIG. 2 is a sectional view taken along the line Y—Y in FIG. 1.
Figure 3:
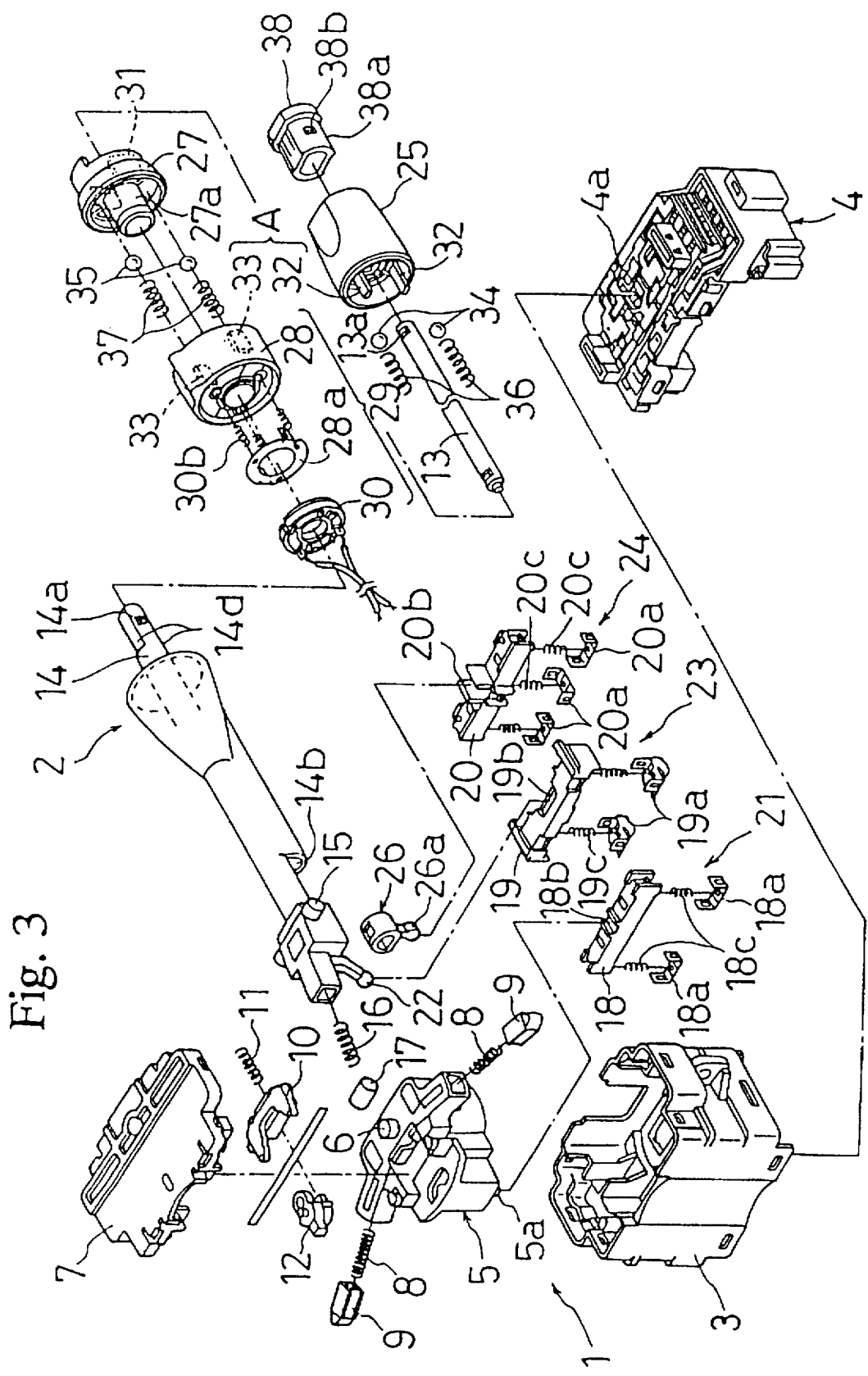
FIG. 3 is an exploded perspective view of the composite switch lever apparatus according to the preferred embodiment.
Figure 4:
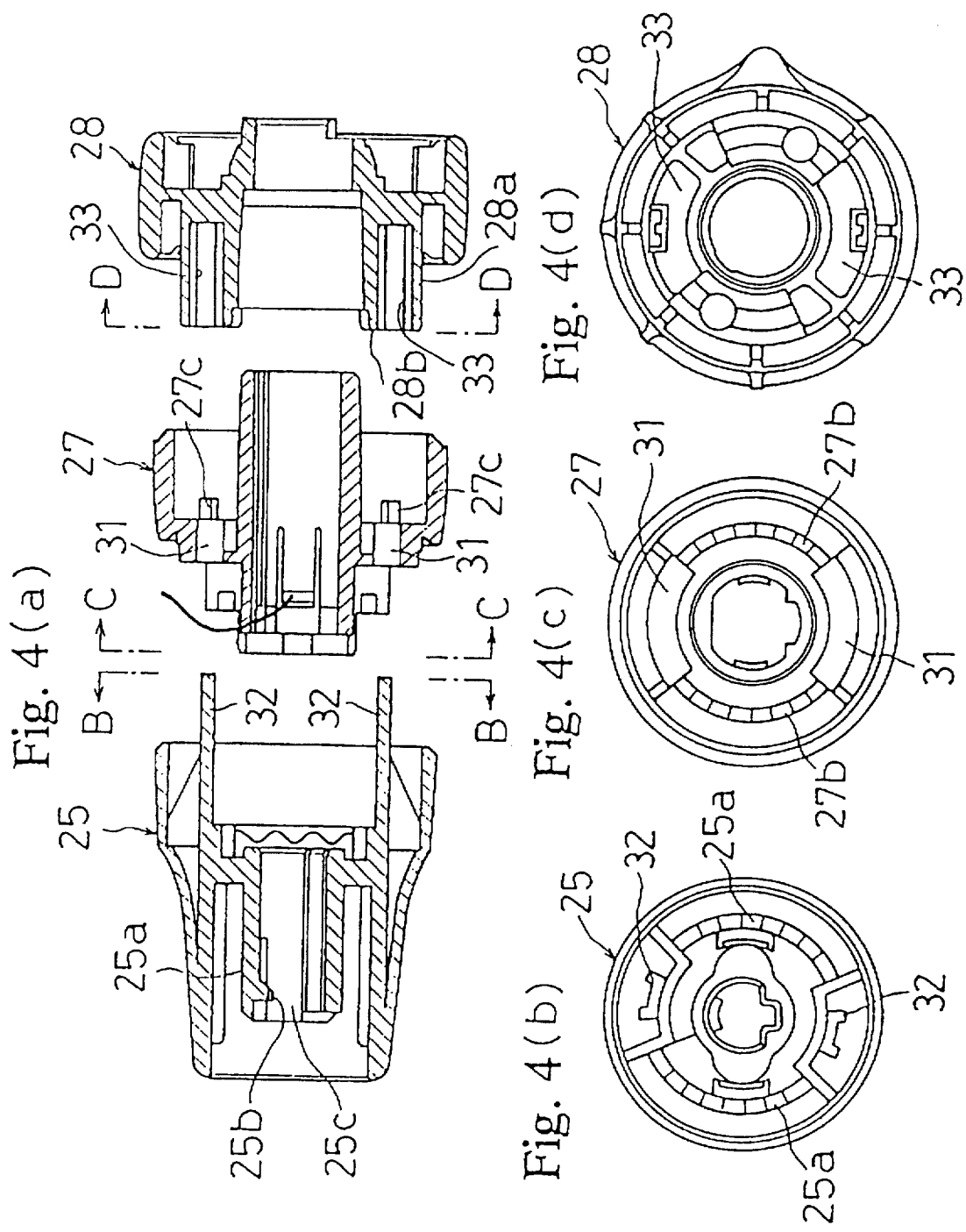

Referring to FIGS. 1 to 7 the composite switch lever apparatus for automobiles according to a preferred embodiment of the present invention will be described.

The composite switch lever apparatus is composed of a base block 1 fixed on a switch base (not shown) mounted on the steering column of an automobile, and a composite switch lever 2 mounted on the base portion of the base block swingably in the peripheral direction of the steering shaft and the axial direction of the steering shaft.

The base block 1 is composed of a casing 3 the bottom portion of which is provided with a fixed pole plate 4, a swing block 5 installed within the casing 3 so as to be rotatable around a projected shaft 6 formed on the swing block 5 in the peripheral direction with respect to the steering shaft, and a cover member 7 for covering the swing block 5. A pair of projectors 9, 9 is mounted at both sides of the swing block 5 and is projected from both sides of the swing block 5 by using a pair of coil springs 8, 8, respectively, thereby maintaining the swing block 5 at the neutral position thereof.

The composite switch lever 2 is, for example, a turn signal switch, a passing switch, a main dimmer switch, or the like. The composite switch lever 2 is rotatable around the projected shaft 6 of the swing block 5 in the front and rear directions, and around a pair of projected shafts 15 in the vertical direction. The composite switch lever 2 provides two rotary switch knobs, i.e., a fog switch knob 28 and a light switch knob 25 at its end point, and a fixed knob 27 fixed at the end point of an outer cylindrical shaft 14. The composite switch lever 2 is formed with an opening at its end point and a hole 14b at its central portion for passing a harness therethrough.

A peripheral contact member 10 is mounted on the upper surface of the swing block 5 for maintaining a rotation attitude within a predetermined angle. The peripheral contact member 10 is biased resiliently into interference with a cancel swing member 12 by a coil spring 11. The swing block 5 can be restored to a stable state by being released from the peripheral contact member 10 when the cancel swing member 12 is moved by a back projection (not shown) supported on the steering shaft.

The outer cylindrical shaft 14 into which the lever shaft 13 is inserted is swingably mounted in the vertical direction on the swing block 5 by utilizing the projected shafts 15 mounted on the base portion of the outer cylindrical shaft 14. The outer cylindrical shaft 14 is swingable at a predetermined angle position by using a bearing roll 17 pressed against an opposite inner wall of the swing block 5 by a coil spring 16.

Numerals 18, 19 and 20 denote switch sliders provided with conductive short members 18a, 19a and 20a through spring members 18c, 19c and 20c, respectively. The switch sliders 18, 19 and 20 are disposed between the swing block 5 and the fixed pole plate 4 such that each of the short members 18a, 19a and 20a may be slidably contacted with each of the switch terminals 4a mounted on the upper portion of the fixed pole plate 4.

The contact slits 18b formed on the upper surface of the switch slider 18 may be contacted, only in the lateral direction, with the contact projections 5a formed on the lower surface of the swing block 5, whereby the switch slider 18 can be slid with respect to the fixed pole plate 4 by swinging the composite switch lever 2 in the peripheral direction, which results in forming a turn signal switch 21.

The contact rectangular slit 19b formed on the upper surface of the switch slider 19 may be contacted, only in the axial direction of the composite switch lever 2, with a contact projection 22 mounted on the inner end of the outer cylindrical shaft 14 of the composite switch lever 2. The switch slider 19 can then be moved in position with respect to the fixed pole plate 4 upon moving the composite switch lever 2 in the axial direction, which results in forming a dimmer switching/passing switch 23.

Moreover, the third switch slider 20 is for composing a rotary light switch 24. The cam member 26 formed at the base portion of the lever shaft 13 provided with the rotary light switch knob 25 at the end point of the lever shaft 13 is provided such that the contact projection 26a of the cam member 26 is adapted to contact, only in the lateral direction, with the contact slit 20b formed on the upper surface of the switch slider 20. According to this structure, when the light switch knob 25 is rotated, the cam member 26 is also rotated together with the contact projection 26a, thereby moving the switch slider 20 in the lateral direction in order to change the relative position with respect to the fixed pole plate 5 in a click-stepwise fashion.

At the flare-shaped opening portion located at the end point of the composite switch lever 2, there is provided a ring-shaped fixed pole plate 30 for the fog light connected with lead wires. The lead wires are passed through the inside of the composite switch lever 2 and pulled out from the portion adjacent the projected shaft 15. The ring-shaped fixed pole plate 30 is composed of a fixed contact to be contacted to the short member 30a of the fog switch knob 28, and a printed substrate having the terminals to be soldered with the lead wires.

A fixed knob 27 is integrally mounted at the end point and peripheral portion of the outer cylinder shaft 14. The annular rotary fog switch knob 28 is mounted on the peripheral surface of the collar portion 27a of the fixed knob 27 between the outer cylindrical shaft 14 and the fixed knob 27. The fixed pole plate 30, the short member 30a used for the fog light, and the fog switch knob 28 are inserted into the outer cylinder shaft 14, and the claw 27d of the fixed knob 27 is adapted to be coupled with the hole 14a formed at the end point and peripheral portion of the outer cylindrical shaft 14. By the coupling of the hole 14a and the claw 27d, the fog switch knob 28 may be rotatably supported on the composite switch lever 2, and the fixed knob 27 may be fitted to the composite switch lever 2. Moreover, the outer cylinder shaft 14 is provided with a pair notches 14d at the end point of the outer cylinder shaft 14 to be fitted with the deviation avoiding portions 27e of the fixed knob 27, thereby achieving a stable fix between the fixed knob 27 and the outer cylindrical shaft 14.

With respect to the coupling mechanism between the fixed knob 27 and the fog switch knob 28, the click contact balls 35, 35 biased by the coil springs 37, 37 projected from the end surface of the fog switch knob 28 are pressed with resilient force to a click contact structure 27b, 27b mounted on the inner side of the fixed knob 27. The click contact structure 27b, 27b comprises small irregular mountains in a circular arrangement.

The fixed knob 27 is provided with the click contact structure 27b to be freely inserted into the gap 28d between the contact projections 28b, 28b of the fog switch knob 28, and elevated walls 27c to be contacted with the side wall of the contact projections 28b, 28b.

The contact projections 28b (which extend over an angle in the circular direction=$\Theta$ a) formed on the collar portion 28a of the fog switch knob 28 are positioned between the elevated walls 27c, 27c (which have an angle in the circular direction between the elevation walls=$\Theta$ b) formed on the opposite surface of the fixed knob 27. Thus, the fog switch knob 28 may be moved within a predetermined angle ($\Theta$ b-$\Theta$ a=25°).

The fixed pole plate 30 used for a fog light may be composed of a printed substrate or the like fixed at the end portion of the outer cylindrical shaft 14. The conductive short member 30a fixed to the other end of the fog switch knob 28 may be slidable with the fixed pole plate 30 for fog light usage with the resilient force by the spring member 30b, thereby providing a fog light intermittence switch 29 for achieving a short circuit or its release operation. The switch harness 29a extracted from the fog light intermittence switch 29 is fetched through the harness hole 14b formed at the back and side positions of the outer cylindrical shaft 14.

The fog light to be actuated or extinguished by the fog light intermittence switch 29 may be the front fog lamps or the rear fog lamps.

The light switch 24 and the fog light intermittence switch 29 compose the related operation mechanism A for contacting in the operating peripheral direction to effect an intermittence operation through the through hole 31 mounted on the fixed knob 27. Connecting projections 32, 32 extend from the one end of the light switch knob 25 in parallel with the lever shaft 13 and have an angle width $\Theta$ t in the circular direction. The end points of the connecting projections are inserted into the interfering holes 33 (which have an angle $\Theta$ c in the circular direction) formed on the fog switch knob 28, respectively, through the through holes 31, 31 (which also have the angle $\Theta$ c in the circular direction).

Upon the fabrication of the light switch knob 25 and the fixed knob 27, the click contact balls 34, 34 biased by the coil springs 36, 36 projected from the end surface of the fixed knob 27 are pressed by utilizing the resilient force due to the coil springs 36, 36 to a click contact structure 25a, 25a mounted on the inner side of the contact structure 25. The click contact structure 25a, 25a comprises small irregular mountains in a circular arrangement.

The circular angle $\Theta$ c between the through hole 31 and the interfering hole 33 is made as a sum (50°+$\Theta$ t) of the angle $\Theta$ t in the circular direction of the connecting projection 32 and the rotation angle ($\Theta$=50°) of the light switch knob 25. The click contact structure 25a is arranged such that the switch operation angle between the first stage and the second stage of the light switch knob 25 is made 25° respectively, by the contact portion with a deeper portion.

The through hole 31, 31 of the fixed knob 27 is provided with the rectangular hole (which has an angle in a circular direction $\Theta$ c=50°+$\Theta$ t) to not disturb the rotation $\Theta$ of the light switch knob 25. In addition, the interfering holes 33, 33 of the fog switch knob 28 have the same angle $\Theta$ c (50°+$\Theta$ t) in the circular direction.

Therefore, when the fog switch knob 28 is rotated by 25° to make the fog light intermittence switch 29 ON, if the light switch knob 25 is located in the OFF position $P_0$, the connecting projection 32 of the light switch knob 25 contacts to the interfering hole 33, thereby rotating the light switch knob 25 to the first position $P_1$ by the rotation angle 25°.

Furthermore, when the light switch knob 25 is rotated from the first position $P_1$ to the OFF position $P_0$ by the angle 25° in order to make the light switch 24 OFF, if the fog switch knob 28 is located in the ON position, the connecting projection 32 contacts to the interfering hole 33 of the fog switch knob 28, thereby rotating the fog switch knob 28 from the ON position $P_4$ to the off position $P_3$ by the rotation angle 25°.

An end cap 38 is fitted at the end point of the light switch knob 25 by using a removal avoiding mechanism composed of a circular slit 13a mounted on the end point of the lever shaft 13, and a fit rib 25b of a plate spring 25a to be fitted. The hooks 25c, 25c formed at the inside of the light switch knob 25 are inserted into the contact holes 38b, 38b, respectively, by utilizing the resilient force provided on the respective members. The plate spring 25a is pressed to the cylinder wall 38a from outside, thereby forming the switch knob 25 and the end cap 38 integrally.

Figure 5:
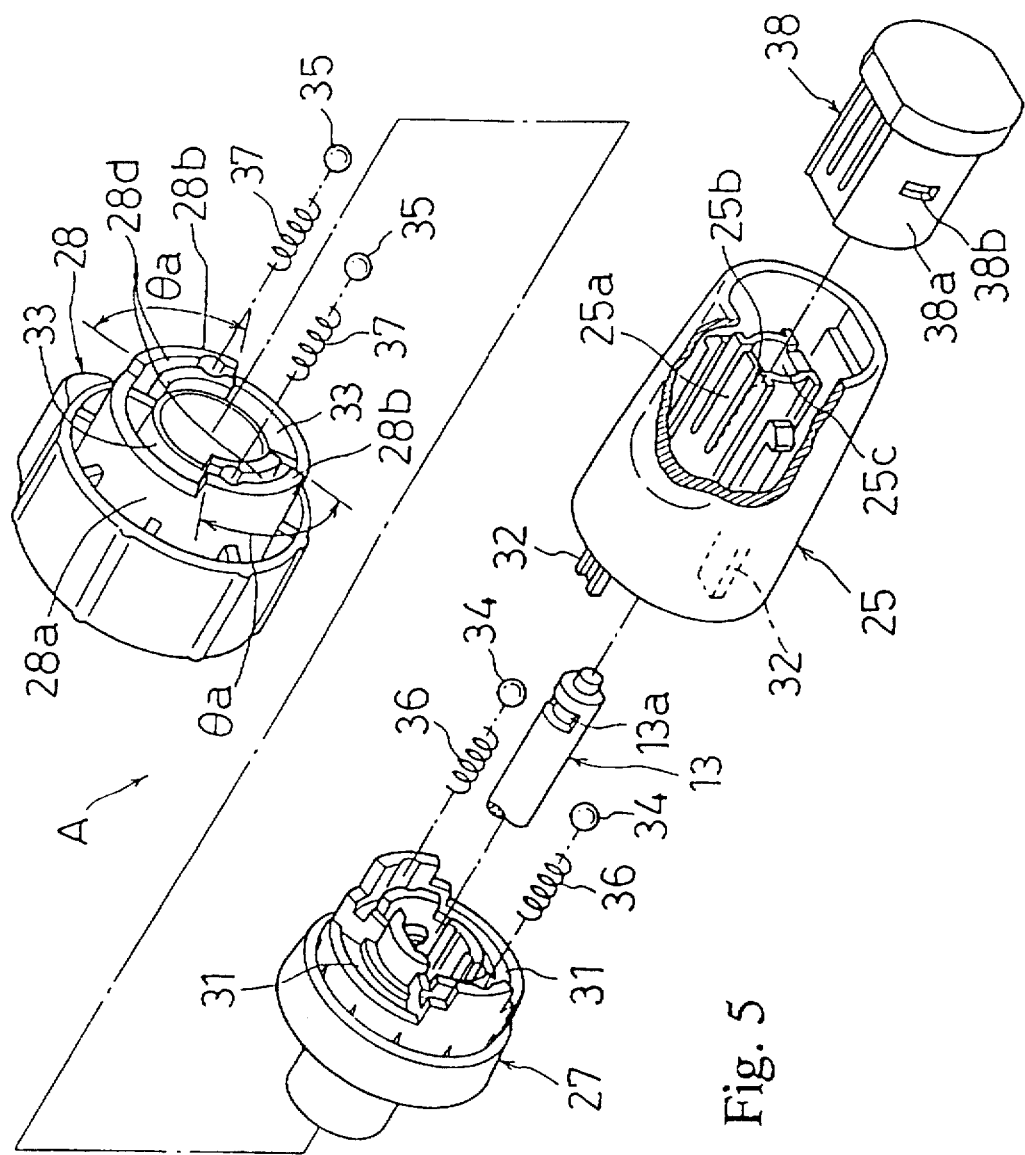
FIG. 5 is a partially broken exploded perspective view of the related operation mechanism.
Figure 6:
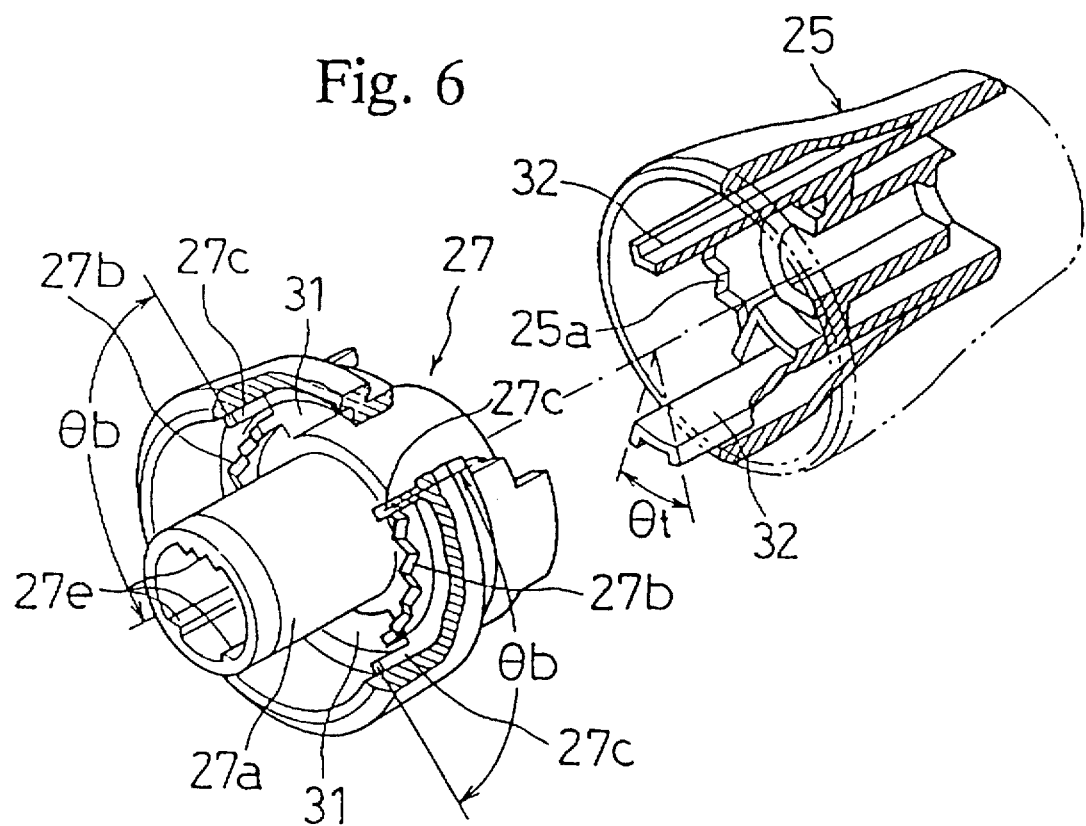
FIG. 6 is a partially broken exploded perspective view for explaining the relation between a fixed knob and a light switch knob.

Referring now to FIGS. 5 to 7, the operation of the related operation mechanism A of the composite switch lever apparatus for automobiles will now be explained.

Figure 7A:
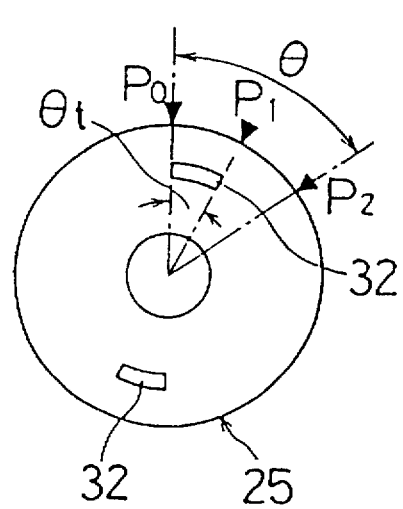
FIG. 7(a) is a view for explaining the rotation region of a light switch knob for the light switch and switch positions.
Figure 7B:
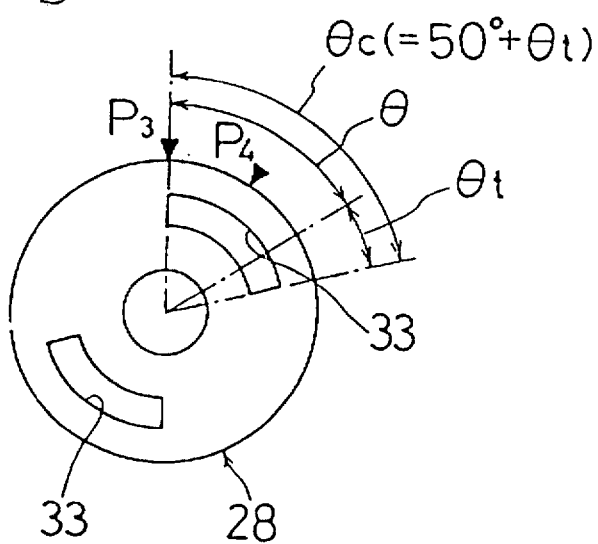
FIG. 7(b) is a view for explaining the rotation region of a fog switch knob for the fog light intermittence switch and switch positions ON and OFF.

FIG. 7(a) is a view for explaining a rotation region of the light switch knob 25 of the light switch 24, and its positions. FIG. 7(b) is a view for explaining a rotation region of the fog switch knob 28 of the fog intermittence switch 29, and the ON and OFF positions of the fog switch knob 28.

The light switch knob 25 has the rotation region $\Theta$ of, for example, 50°, namely the region of 25° from the position $P_0$ corresponding to the OFF position of the light switch 24 to the first position $P_1$, and further the region of 25° from the position $P_1$ to the second position $P_2$. Moreover, the first position $P_1$ may be set as the position of the head light ON, and the second position $P_2$ may be set as the position of the small light ON (even when the light switch knob 25 is in the position $P_1$, the small light is in the ON state).

As to the fog switch knob 28, it may be rotated in the rotation region from the OFF position $P_3$ corresponding to the OFF position of the fog light intermittence switch 29 and to the ON position $P_4$ corresponding to the ON position by rotation of 25°.

Therefore, in the state that both of the light switch 24 and the fog light intermittence switch 29 are OFF, if the fog light intermittence switch 29 is manually set to ON by rotating the fog switch knob 28, the interfering holes 33 press the connecting projections 32 thereby rotating the light switch knob 25 by 25°, and the light switch 24 may be rotated to the first position $P_1$. Furthermore, the first position $P_1$ corresponds to the ON position of the head light, and the small light and the fog light are actuated together with each other.

In this state, if the light switch 24 is rotated to the second position $P_2$ by rotating the light switch knob 25 by 25°, the connecting projection 32 projected from the light switch knob 25 slidably moves within the interfering hole 33 of the fog switch knob 28, thereby actuating the head lights without any contact between the connecting projection 32 and the interfering hole 33.

If the light switch 24 is manually switched OFF by changing the light switch knob 25 to the position $P_0$ for OFF, in the state of ON for the light switch 24 and the fog light intermittence switch 29, the connecting projection 32 may be interfered within the region from the first position $P_1$ for OFF to the position $P_0$.

The head light and the fog light are extinguished together with each other by rotating the fog switch knob 28 to the OFF position $P_3$ by means of using the interfering hole 33, thereby making the fog light intermittence switch 29 OFF. The light switch 24 is communicated with the fog light intermittence switch 29 as mentioned above.

The fog switch knob 28 of the present invention may be the knob in which the above mentioned rotated operation can be effected by a single rotary switch or by a two stage rotary switch as the light switch knob 25. In this case, the fog switch knob 25 can actuate the front fog light and the small light by means of the first stage rotation, and further the rear fog light may be actuated by means of the second stage rotation. When the fog switch knob 25 is changed from the second stage to the first stage, the rear fog light may be actuated, and when it is restored back to the OFF position, the front fog light and the small light may be extinguished.

As is similar to the light switch knob, the fog switch knob 28 may be rotated by, for example, 25° at the first stage, and further by 25° at the second stage. As a result, the rotation region of the fog switch knob 28 becomes, for example, 50° (Θ b-Θ a), and the angle Θ in the circle direction of the contact projection 28b may be reduced to 25°.

As mentioned above, the composite switch lever apparatus for automobiles of the present invention has the structure wherein a plurality of switches are installed in the composite switch lever mounted on a steering column of an automobile, and a light switch is related with a fog light intermittence switch by a related operation mechanism in which a connecting projection mounted on the light switch knob and an interfering hole mounted on the fog switch knob are adapted to be contacted with each other with a predetermined idle angle in the rotation direction.

Therefore, if the fog light intermittence switch is manually switched ON in the state that the light switch and the fog light intermittence switch are switched OFF, a small light may be actuated by rotating the light switch to ON. Further, if the light switch is manually switched OFF from the state of both switches being switched ON, the fog light intermittence switch is also switched OFF, and the fog light intermittence switch is thus communicated with the light switch.

Therefore, according to the present invention, it is prevented that a driver forgets to switch off lights upon getting out of the automobile or turning on a small light, and it is possible to reduce the volume of the wiring harness between the switches and lights.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A composite switch lever assembly for automobiles, comprising:

a composite switch lever (2) having a base portion swingably mounted on a base block (1) for mounting on a steering column of an automobile; and a plurality of rotary switches coupled to said composite switch lever (2);

wherein a first rotary switch knob having ON and OFF positions for actuating a first switch group ON and OFF and a second rotary switch knob having ON and OFF positions for actuating a second switch group ON and OFF are rotatably mounted on said composite switch lever (2) with a common axis, and said first rotary switch knob and said second rotary switch knob are mechanically coupled with each other through a related operation mechanism with a predetermined idle angle in a rotation direction, said related operation mechanism comprising a connecting projection extending from said first rotary switch knob and an interfering hole formed in said second rotary switch knob for receiving said connecting projection, said connecting projection being movable over said predetermined idle angle within said interfering hole, said connecting projection being movable with said first rotary switch knob into engagement with a first side of said interfering hole for rotating said second rotary switch knob to its OFF position upon rotation of said first rotary switch knob to its OFF position, and a second side of said interfering hole being movable with said second rotary switch knob into engagement with said connecting projection for rotating said first rotary switch knob to its ON position upon rotation of said second rotary switch knob to its ON position.

2. A composite switch lever assembly for automobiles according to claim 1, wherein said first rotary switch knob and said second rotary switch knob are composed of a light switch (24) for selectively switching a plurality of switch terminals and a fog light switch (29) for selectively connecting switch terminals, and said related operation mechanism couples the switches to relate together selected positions of the light switch and the fog light switch.

3. A composite switch lever for automobiles according to claim 2, wherein said first rotary switch knob is a light switch knob (25), said related operation mechanism further comprises a fixed knob (27) provided with a through hole (31) with a rectangular shape extending in the peripheral direction, said second rotary switch knob is a fog switch knob (28), said interfering hole (33) has a rectangular shape, and said connecting projection (32) has end points inserted into said interfering hole (33) through said through hole (31).

4. A composite switch lever assembly for automobiles, comprising:

a composite switch lever (2) having a base portion swingably mounted on a base block (1) for mounting on a steering column of an automobile; and a plurality of rotary switches coupled to said composite switch lever (2);

wherein a first rotary switch knob having ON and OFF positions for actuating a first switch group ON and OFF and a second rotary switch knob having ON and OFF positions for actuating a second switch group ON and OFF are rotatably mounted on said composite switch lever (2) with a common axis, and said first rotary switch knob and said second rotary switch knob are mechanically coupled with each other through a related operation mechanism with a predetermined idle angle in a rotation direction, said related operation mechanism comprising a connecting projection extending from said first rotary switch knob and an interfering hole formed in said second rotary switch knob for receiving said connecting projection said connecting projection being movable over said predetermined idle angle within said interfering hole said connecting projection being movable with said first rotary switch knob into engagement with a first side of said interfering hole for rotating said second rotary switch knob to its OFF position upon rotation of said first rotary switch knob to its OFF position, and a second side of said interfering hole being movable with said second rotary switch knob into engagement with said connecting projection for rotating said first rotary switch knob to its ON position upon rotation of said second rotary switch knob to its ON position;

wherein said first rotary switch knob is a light switch knob (25), said second rotary switch knob is a fog switch knob (28), said related operation mechanism further comprises a fixed knob (27) provided with a through hole (31) extending in a peripheral direction, and said connecting projection (32) has an end point inserted into said interfering hole (33) through said through hole (31);

wherein said fixed knob (27) is provided with a click contact structure (27b) movably inserted into a gap (28d) formed between side walls in the periphery direction of said through hole (31) and contact projections (28b, 28b) of said fog switch knob (28), and an elevated wall (27c) adapted to be contacted to side walls of said contact projections (28b, 28b).

5. A composite switch lever for automobiles according to claim 4, wherein said light switch knob (25) is supported at the end portion of a lever shaft (13) rotatably supported on an outer cylinder (14) of said composite switch lever (2), said fixed knob (27) is fitted to an end point of said outer cylinder (14) through said fog switch knob (28), and said fog switch knob (28) is rotatably supported by said outer cylinder (14) in a single shaft structure.

6. A composite switch lever for automobiles according to claim 5, wherein said fog light switch (29) comprises a short member (30a) contacted to said fog switch knob (28), and a fixed pole plate (30) for a fog light fixed on said composite switch lever (2).

7. A composite switch lever for automobiles according to claim 6, wherein when said fog switch knob (28) is rotated, said fog light switch (29) actuates either one of a front fog light and a rear fog light by a first stage operation, and actuates both of the front fog light and the rear fog light by a second stage operation.

8. A composite switch lever for automobiles according to claim 2, wherein when said fog switch knob (28) is rotated, said fog light switch (29) actuates either one of a front fog light and a rear fog light by a first stage operation, and actuates both of the front fog light and the rear fog light by a second stage operation.

9. A composite switch lever for automobiles according to claim 1, wherein said first rotary switch knob is a light switch knob (25), said related operation mechanism further comprises a fixed knob (27) provided with a through hole (31) with a rectangular shape extending in the peripheral direction, said second rotary switch knob is a fog switch knob (28), said interfering hole (33) has a rectangular shape, and said connecting projection (32) has end points inserted into said interfering hole (33) through said through hole (31).

10. A composite switch lever for automobiles according to claim 9, wherein said fixed knob (27) is provided with a click contact structure (27b) movably inserted into a gap (28d) formed between side walls in the periphery direction of said through hole (31) and contact projections (28b, 28b) of said fog switch knob (28), and an elevated wall (27c) adapted to be contacted to the side walls of said contact projections (28b, 28b).

11. A composite switch lever for automobiles according to claim 10, wherein said light switch knob (25) is supported at the end portion of a lever shaft (13) rotatably supported on an outer cylinder (14) of said composite switch lever (2), said fixed knob (27) is fitted to an end point of said outer cylinder (14) through said fog switch knob (28), and said fog switch knob (28) is rotatably supported by said outer cylinder (14) in a single shaft structure.

12. A composite switch lever for automobiles according to claim 2, wherein said fog light switch (29) comprises a short member (30a) contacted to said second rotary switch knob (28), and a fixed pole plate (30) for a fog light fixed on said composite switch lever (2).

* * * * *